US009288402B2

(12) United States Patent
Moldovan et al.

(10) Patent No.: US 9,288,402 B2
(45) Date of Patent: Mar. 15, 2016

(54) RANDOM ACCESS ADDRESSING ON ACTIVE PIXEL IMAGE SENSOR

(71) Applicant: ISIS Innovation Limited, Oxford (GB)

(72) Inventors: Grigore Moldovan, Oxford (GB); Chao Lin, Oxford (GB); Angus Ian Kirkland, Oxford (GB)

(73) Assignee: ISIS Innovation Limited, Oxford (GB)

( * ) Notice: Subject to any disclaimer, the term of this patent is extended or adjusted under 35 U.S.C. 154(b) by 0 days.

(21) Appl. No.: 14/349,771

(22) PCT Filed: Oct. 4, 2012

(86) PCT No.: PCT/GB2012/052459
§ 371 (c)(1),
(2) Date: Apr. 4, 2014

(87) PCT Pub. No.: WO2013/050767
PCT Pub. Date: Apr. 11, 2013

(65) Prior Publication Data
US 2014/0247382 A1    Sep. 4, 2014

(30) Foreign Application Priority Data
Oct. 6, 2011  (GB) .................................. 1117319.2

(51) Int. Cl.
*H04N 3/14*       (2006.01)
*H04N 5/335*     (2011.01)
(Continued)

(52) U.S. Cl.
CPC ............. *H04N 5/2355* (2013.01); *H04N 5/232* (2013.01); *H04N 5/341* (2013.01);
(Continued)

(58) Field of Classification Search
CPC ..... H04N 5/2355; H04N 5/335; H04N 5/235; H04N 5/35554; H04N 1/32245
USPC .................................. 348/294, 298, 302, 308
See application file for complete search history.

(56) References Cited

U.S. PATENT DOCUMENTS 6,977,685 B1 * 12/2005 Acosta-Serafini et al. ... 348/308
2003/0058137 A1    3/2003 Tsai
(Continued)

FOREIGN PATENT DOCUMENTS

EP        1742369 A2    1/2007
EP        2239937 A2    10/2010
WO    WO-2007135158 A1   11/2007

OTHER PUBLICATIONS

Bart Dierickx et al., "Random addressable active pixel image sensors", SPIE Proceedings, The International Society for Optical Engineering, vol. 2950, pp. 2-07, Oct. 10, 1996.
(Continued)

*Primary Examiner* — Yogesh Aggarwal
(74) *Attorney, Agent, or Firm* — Honigman Miller Schwartz and Cohn LLP

(57) ABSTRACT

An active pixel image sensor comprises a pixel array of active pixels that are capable of being random access addressed to provide pixel readout signals from the addressed pixels on N output lines, where N is a plural integer and M ADC lanes capable of performing analog-to-digital conversion of pixel readout signals, where M is a plural integer less than N. A switching arrangement is capable of selectively connecting output lines to the M ADC lanes. A control unit provides random access addressing of the pixels, and in synchronisation therewith controls the switching arrangement to connect the output lines on which the addressed pixels provide pixel readout signals to ADC lanes.

13 Claims, 7 Drawing Sheets

(51) Int. Cl.
  *H04N 5/235* (2006.01)
  *H04N 5/355* (2011.01)
  *H04N 5/378* (2011.01)
  *H04N 5/341* (2011.01)
  *H04N 5/3745* (2011.01)
  *H04N 5/376* (2011.01)
  *H04N 5/232* (2006.01)
  *H04N 1/32* (2006.01)

(52) U.S. Cl.
  CPC .......... *H04N 5/35554* (2013.01); *H04N 5/376* (2013.01); *H04N 5/378* (2013.01); *H04N 5/37452* (2013.01); *H04N 1/32245* (2013.01)

(56) References Cited

U.S. PATENT DOCUMENTS

2003/0058345 A1   3/2003   Morris et al.
2004/0155175 A1   8/2004   McNulty

OTHER PUBLICATIONS

International Search Report for Application No. PCT/GB2012/052459 dated Dec. 13, 2012.
United Kingdom Search Report for Application No. GB1117319.2 dated Jan. 17, 2012.

\* cited by examiner

RANDOM ACCESS ADDRESSING ON ACTIVE PIXEL IMAGE SENSOR

The present invention relates to an active pixel image sensor in the field of imaging, for example optical or radiation imaging, and more specifically related to addressing pixels and readout in an active pixel image sensor.

The background of invention is a wide family of conventional active pixel image sensors consisting of a pixel array of sensitive pixels, one or multiple analogue to digital converters (ADCs) in one or multiple ADC lanes and a programmable addressing unit (sequencer, scanner or micro-processor) that addresses the pixels of the pixel array to provide pixel readout signals on output lines that are supplied to the ADC lanes.

The general operation of such active pixel image sensors is that the programmable addressing unit addresses the pixels by generating a sequence of column and row pixel addresses, that cause desired pixels to provide pixel readout signals in turn to one of the ADC lanes. Most typically, the addressing is scanned, for example from upper left corner to the lower right corner of the full pixel array, but random access is also possible in some architectures. Generally, if more than one ADC is used to increase total readout bandwidth, then these ADCs are permanently connected in one more lanes of higher total speed, as controlled by a multiplexer, or are permanently connected in parallel and several pixels are addressed at the same time.

Where the pixel addressing unit is a scanner, then in some architectures it may be programmable to allow for configuration of start row and start column, as well as the width and height of such scanned regions. The rate may also be programmable, for example by providing configurable parameters such as the addressing speed and time between scans, which provide the frame rate and integration time, respectively. Random access to the pixel array is also possible, for example where the pixel addressing unit is a micro-processor, and this allows for the use of regions of interest with free shape and with varying frame rate. In this case, one approach is for an array decoder logic may be used such that the microprocessor only generates array instructions, leaving the detailed pixel level logic to the faster array decoder circuitry and therefore increasing the pixel addressing speed.

Given the permanent nature of the physical connections between the pixel addressing unit and the ADCs, the operation and output of such an image sensor is pre-determined and fixed by the designed-in operation mode. While random access to the pixel array is programmable through the pixel addressing unit, there is a restriction on the readout bandwidth, which causes practical limitations, that may impact for example in the case of complex multiple regions of interest, or independent data output of such multiple regions of interest. This may restrict the practical applications to which such an imager sensors may be applied.

According to the present invention, there is provided an active pixel image sensor comprising:

a pixel array of active pixels that are capable of being random access addressed to provide pixel readout signals from the addressed pixels on n output lines, where n is a plural integer;

M ADC lanes arranged in parallel and each capable of performing analog-to-digital conversion of pixel readout signals, where M is a plural integer less than N;

a switching arrangement capable of selectively connecting output lines to the m ADC lanes;

a control unit arranged to provide random access addressing of the pixels, and in synchronization therewith to control the switching arrangement in accordance with the random access addressing of the pixels to connect the output lines on which the addressed pixels provide pixel readout signals to ADC lanes.

Such an active pixel image sensor has a pixel array and multiple parallel ADC lanes in which random access addressing of the pixel array is performed in an analogous manner to some known active pixel image sensors, as discussed above, so that pixel readout signals from the addressed pixels are supplied on output lines in turn to the ADC lanes. However, in addition to such random access addressing of the pixel array, the provision of the switching arrangement that is capable of selectively connecting output lines to the m ADC lanes allows for control of the connection of the output lines on which the addressed pixels provide pixel readout signals to the ADC lanes. As a result, the ADC lanes are also addressable. This enables real time configuration of the connections between the ADC lanes and the output lines of the pixel array that are subject to random access.

In this manner, the present invention allows the image sensor to maintain optimum bandwidth of readout, irrespective of both (a) the configuration of the pixels that are randomly accessed, for example in the case of pixel regions of interest that are not rectangular, and (b) the rate at which different pixels are addressed, for example if different pixels of the image sensor are addressed at different rates and/or pixels are addressed at time intervals that are not regular. For example, such an optimum operation is maintained even if there are several regions of interest configured on the same imager, each of a different frame rate.

Thus, embodiments of the present invention can provide one or more of the following advantages in any combination:

more efficient use of data bandwidth, as the image sensor can be controlled to maximize the use of the ADC lanes for all pixel addressing configurations, such as multiple regions of interest;

increased time resolution, as exposure time and readout are dynamically configured to use the entire ADC bandwidth; and wider dynamic range, as the frame rate is not limited by independent ADC lanes.

Such advantages of particular benefit in advanced imaging applications that require programmable optimization, such as for highest frame rate, dynamic range or data compression, for example in scientific applications that require independent programmable regions of interest of different frame rate on the same imaging chip, machine vision, such as face recognition, object tracing, smart cameras, such as for security or general consumer electronics.

To allow better understanding, an embodiment of the present invention will now be described by way of non-limitative example with reference to the accompanying drawings, in which.

In the following description, the reference numerals label elements of the drawing that is being described, noting that identical reference numerals are used in other drawings to label different elements.

Figure 1:
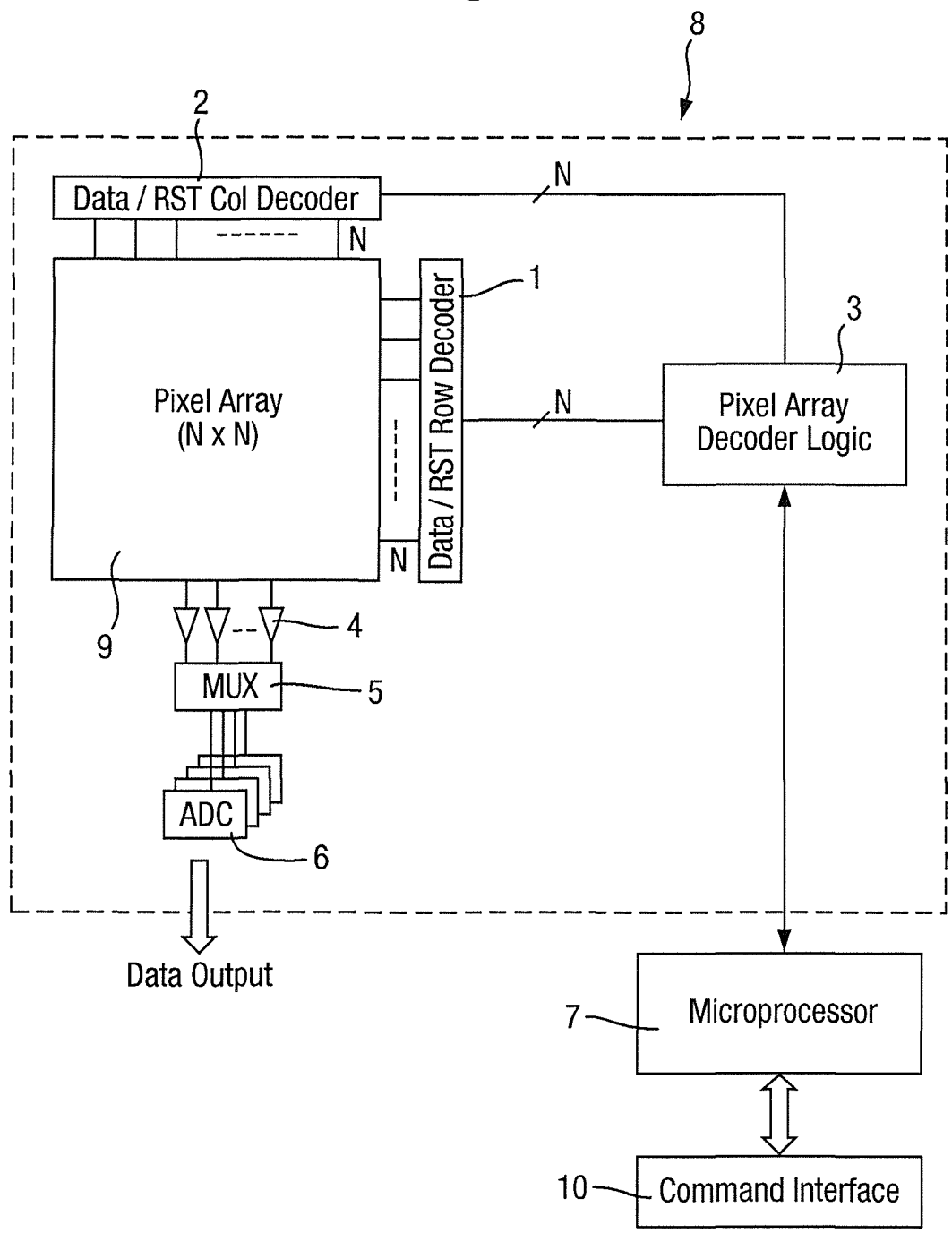
FIG. 1 is a diagram of active pixel image sensor as a comparative example.

FIG. 1 is a diagram of active pixel image sensor 8 that is a comparative example that is not an embodiment of the present invention. The active pixel image sensor 8 comprises a pixel array 9 of N by N active pixels. The pixel array 9 has a matrix addressing arrangement of control lines connected to rows and columns of pixels to provide random access addressing of pixels. The addressed pixels provide pixel readout signals on N output lines, in this example being one control line in respect of each column of pixels.

To provide random access addressing of the pixel array 9, the active pixel image sensor 8 comprises a control unit consisting of a pixel array decoder logic unit 3, a data/RST row decoder 1 and a data/RST column decoder 2.

The pixel array decoder logic unit 3 generates row and column addresses from pixel addresses supplied by a microprocessor 7 that is external to the active pixel image sensor 8 and connected thereto. The microprocessor 7 has a command interface 10. The row and column addresses are supplied from the pixel array decoder logic unit 3 to the data/RST row decoder 1 and the data/RST column decoder 2.

The data/RST row decoder 1 decodes the pixel row address and generates control signals for addressing the pixel array 8, being readout control signals and reset control signals, that are supplied to the pixel array 8. For example, for a 2048 by 2048 pixel array 8, the data/RST row decoder 1 takes 12-bit row address and sets the corresponding "Data sel" and/or "RST sel" control lines among 2048 control lines. Similarly, the data/RST column decoder 2 decodes the pixel column address and generates control signals for addressing the pixel array 8, being readout control signals and reset control signals, that are supplied to the pixel array 8. For example, for a pixel array 8 of 2048 by 2048 pixels, the data/RST column decoder 2 takes 12-bit column address and sets the corresponding "Data sel" and/or "RST sel" control lines among 2048 control lines. This addressing causes pixel readout signals from the addressed pixels to be output on output lines. Each output line contains an amplifier 4.

The active pixel image sensor further comprises plural ADC lanes 6 each comprising plural ADCs, the number of ADCs being dependent on the ratio of the ADC conversion speed to the pixel readout speed. By so combining ADCs into a single ADC lane 6, the ADC lane 6 can provide higher throughput bandwidth compared to a simple ADC. The ADCs in each ADC lane 6 perform analog-to-digital conversion of pixel readout signals supplied thereto.

The output lines are connected to the ADC lanes 6 through a multiplexer 6. The multiplexer 6 connects the output lines to the ADC lanes 6 in succession, i.e. one at a time. The switching is performed in a predetermined sequence. In this manner, each ADC lane 6 converts an analogue pixel readout signal from the connected output line, i.e. from the addressed pixel, into a digital signal for each readout clock cycle.

Figure 2:
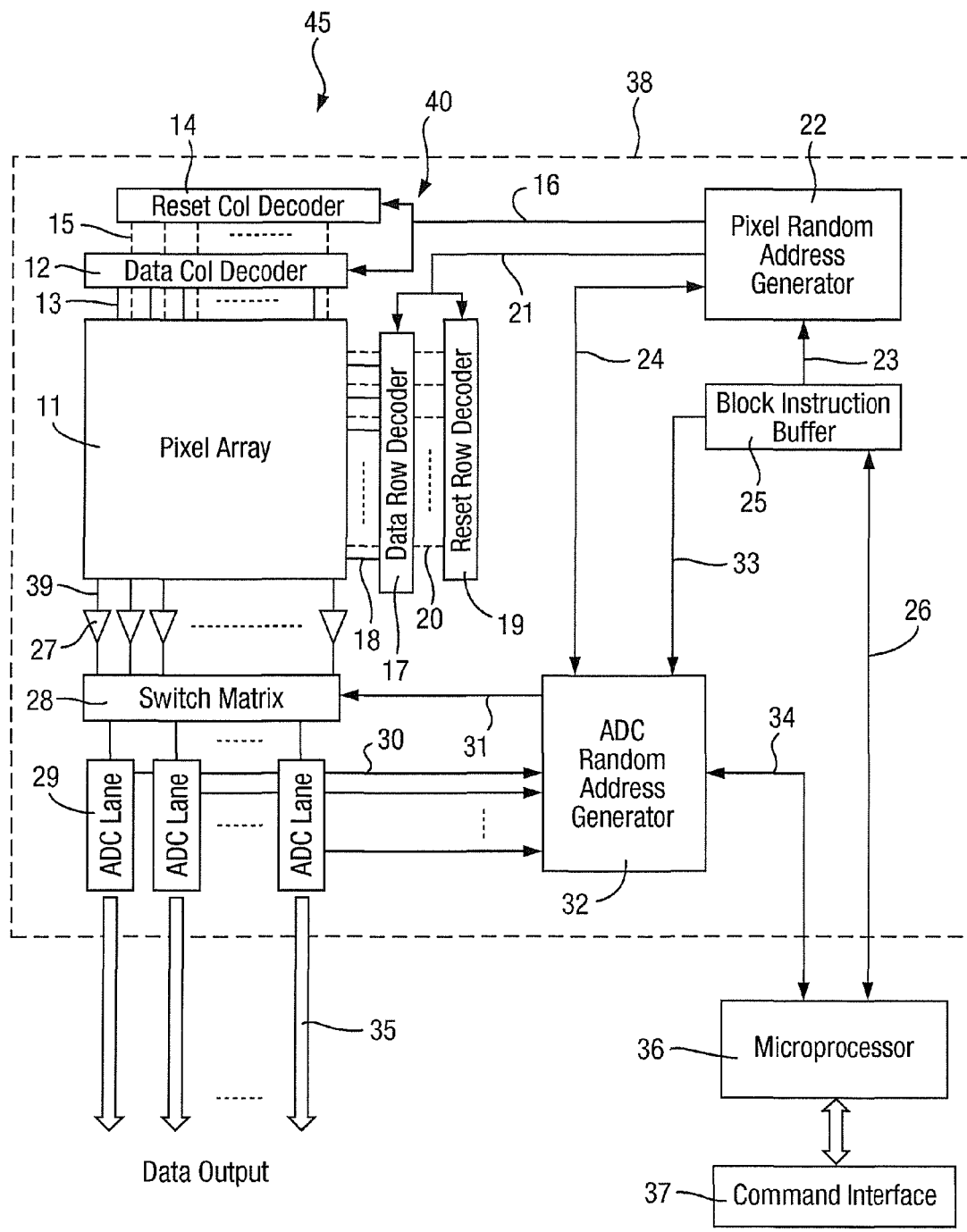
FIG. 2 is a diagram of an active pixel image sensor which is an embodiment of the present invention.

FIG. 2 is a diagram of an active pixel image sensor 45 that is an embodiment of the present invention. The active pixel image sensor 45 is implemented in a semiconductor chip 38. The active pixel image sensor 45 comprises a pixel array 11 of N by N active pixels, where N is a plural number. As an alternative to being a square array with N pixels in each row and each column, the pixel array 11 could be a rectangular array with different numbers of pixels in the rows and columns.

The pixel array 11 has a matrix addressing arrangement of control lines connected to rows and columns of pixels to provide random access addressing of pixels. The control lines consist of (1) for resetting pixels, reset column control lines 15 and reset row control lines 20 for resetting pixels and (2) for causing a pixel to output a pixel readout signal, readout column control lines 13 and readout row control lines 18. Each of (1) the reset column control lines 15 and reset row control lines 20 for resetting pixels and (2) the readout column control lines 13 and readout row control lines 18 are arranged in a matrix addressing arrangement. This provides random access addressing of any pixel by simultaneously supply of control signals on the reset column and row control lines 15 and 20, or on the readout column and row control lines 13 and 18.

The addressed pixels provide pixel readout signals on N output lines 39, in this example being one output line 39 in respect of each column of pixels, although rows and columns could be inverted. As is conventional for a CMOS construction, each output line 39 contains an amplifier 27 which may be a general purpose analogue amplifier.

To provide random access addressing of the pixel array 11, the active pixel image sensor 45 is controlled by a control unit 40 including a reset column decoder 14, a reset row decoder 19, a readout column decoder 12, a readout row decoder 18 and a pixel random address generator 22.

The pixel random address generator 22 generates column and row addresses 16 and 21 in a binary format that identify the pixels to be addressed. In general, if there are N pixels in the column or row direction, then the binary address has n bits where N=2n. For example, in the case of a pixel array 11 comprising a 2048 by 2048 array of pixels, the row and column addresses are 12-bit binary numbers. The pixel random address generator 22 contains address generating logic that is appropriate for the application of the image sensor 45.

The row addresses are supplied to the reset row decoder 19 and readout row decoder 17, and the column addresses are supplied to the reset column decoder 14 and readout column decoder 12. The reset column decoder 14 and reset row decoder 19 decode the row and column addresses supplied thereto and generate and supply reset control signals to the reset control lines 15 and 20 at appropriate timings. The readout column decoder 12 and readout row decoder 17 decode the row and column addresses supplied thereto and generate and supply readout control signals to the readout control lines 13 and 18 at appropriate timings, and thereby address the pixels.

The active pixel image sensor 45 further comprises M parallel ADC lanes 29, where M is a plural number less than the number of output lines 39 (i.e. N). As described further below, each ADC lane 29 comprises plural ADCs. Each ADC lane 29 performs analog-to-digital conversion of pixel readout signals supplied thereto, thereby converting the pixel readout signals into digital signals. The converted digital pixel readout signals are output from the ADC lanes 29 and from the image sensor 45 on one or more data output channels 35. For high bandwidth data output, plural data output channels 35 might be used. The data output channels 35 may communicate data in any suitable format, for example LVDS, and may have any suitable structure, for example including a data output buffer and/or interfaces.

The active pixel image sensor 45 further comprises a switch matrix 28 as a type of switching arrangement connected between the output lines 39 of the pixel array 11 and the ADC lanes 29. The switch matrix 28 selectively connects any of the output lines 39 to any of the ADC lanes 29, in a random access manner. In the example of the pixel array 11 described above where a pixel readout signal appears on one output line 39 at a time, the switch matrix 28 makes the connections in succession, i.e. one at a time, but not necessarily in a predetermined sequence. The switch matrix 28 is an N to M multiplexer, and may be composed of analogue switches. For example, in the case of a pixel array 11 comprising a 2048 by 2048 array of pixels with 16 ADC lanes 29, the switch matrix 28 is a 2048 to 16 multiplexer.

In contrast to the active pixel image sensor shown in FIG. 1 that has physical connections between the output lines 39 and the ADC lane 29, the plural ADC lanes 29, in cooperation with the switch matrix 28, allow the conversion to be freely performed by any ADC line 29 according to the ADC address. This provides the flexibility to convert any pixel output signal using any ADC lane 29 on the fly.

To provide random access addressing of ADC lanes 29, the control unit 40 of the active pixel image sensor 45 further comprises an ADC random address generator 32 that generates proper ADC random addresses for the switch matrix 28 for selection of ADC lanes 29. The ADC random addresses could be generated using a suitable logic or a micro-instruction. In the latter case, the ADC random address generator 32 gets ADC lane address from the micro-instruction. This also allows grouping of pixel readout signals from different regions of interest to different ADC lanes 29 on the fly, which could separate data output in the way user prefer and might reduce data transfer or post-processing design difficulties for complicated or special applications.

The ADC random address generator 3 generates switch matrix control signals in accordance with the random access addressing of the pixels, and the switch matrix control signals are supplied on a switch control line 31 to the switch matrix 28. The switch matrix control signals control the switch matrix 28 to connect the output lines 39 on which the addressed pixels provide pixel readout signals, in synchronization with the addressing of the pixels, to selected ADC lanes 29. As this control is performed in accordance with the random access addressing of the pixels, not in a predetermined sequence, it is possible to connect only output lines 39 on which pixel readout signals appear. In this manner, the conversion bandwidth provided by the ADC lanes 29 can be efficiently used.

Each ADC lanes 29 supplies status signals on status lines 30 to the ADC random address generator 32 that indicates whether it is ready for operation. As an alternative to selecting ADC lanes 29 on the basis of their expected status, the ADC random address generator 32 may select ADC lanes 29 that are indicated by their status signals to be ready for operation, and generates control signals so as to connect output lines 39 to those ADC lanes 29. This can improve the efficiency of use of the conversion bandwidth provided by the ADC lanes 29 by allowing adaptation to the signals that are being processed. This can improve the efficiency by allowing adaptation to any defect or failure of ADCs in the ADC lanes 29. That can increase the yield of manufacture, as imager sensors with defective ADC lanes 29 can still operate using the remaining ADC lanes 29.

The random access addressing of pixels which is implemented by the pixel random address generator 22 and the ADC random address generator 32 may be used to address pixels in arbitrary sequences and at arbitrary rates. Pixels may be addressed in one or more regions of interest within the pixel array 11. Such regions of interest may be of arbitrary shape. Different pixels may be addressed at different rates, that may vary over time (variable rate) or by region (multiple rate). For example different regions of pixels may each be addressed at an independent rate. The control of the switch matrix 29 allows the conversion bandwidth provided by the ADC lanes 29 to be efficiently used. Conversely within the limits of that conversion bandwidth, the control of the switch matrix 29 allows more complex random access addressing than would otherwise be possible.

The pixel random address generator 22 and the ADC random address generator 32 are controlled to select the random access addressing as follows.

A microprocessor 36 that is external to the active pixel image sensor 45 is controlled by a user through a command interface 37 and is connected to the active pixel image sensor 45 to set the pixels to be addressed and frame rates. In particular, the microprocessor 36 generates setting and control signals for the pixel random address generator 22 and the ADC random address generator 32.

In one arrangement, the active pixel image sensor 45 includes a block instruction buffer 25 that stores block instructions in the form of addresses and/or micro-instructions that indicate blocks of pixels to be addressed. The microprocessor 36 reads/writes the block instructions, that is reads/writes addresses and/or micro-instructions, to/from the block buffer 25 over a data input/output bus 26.

Figure 3A:
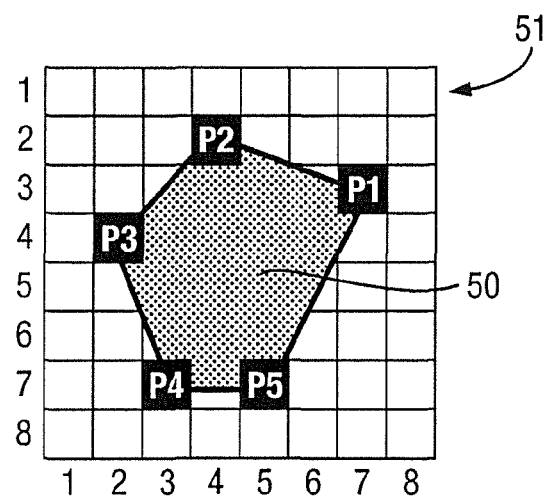
FIGS. 3a to 3c are a set of diagrams illustrating an example of a block instruction.
Figure 3B:
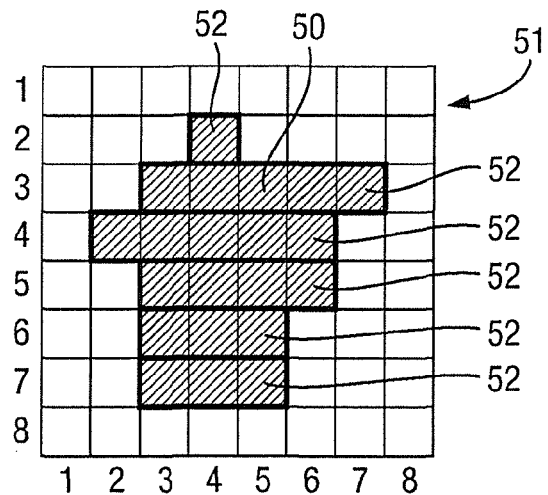
Figure 3C:
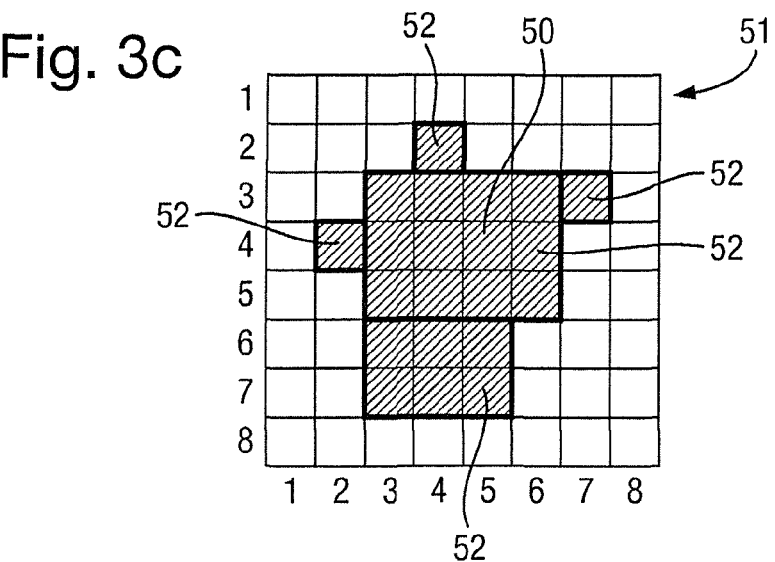

By way of example, FIGS. 3a to 3c illustrate a region of interest 50 within a grid 51 of 8 by 8 pixels in the pixel array 11 and two alternative block instructions for addressing that region, as follows.

FIG. 3a shows the region of interest 50 which in this case is a polygon described by five nodes P1(7, 3), P2(4, 2), P3(2, 4), P4(3, 7) and P5(5, 7). In general the region of interest 50 could take any shape.

FIG. 3b shows in bold outline the shape of five line blocks 52 identified by the block instructions that may be used to represent the region of interest 50. If the block instructions represent the line blocks 52 by coordinates in the form (y, x1, x2) where y is the y-coordinate of the line block 52 and x1 and x2 are the x-coordinates of the start and end of the line block 52, then the coordinates of the line blocks 51 are (2, 4, 4), (3, 3, 7), (4, 2, 6), (5, 3, 6), (6, 3, 5), (7, 3, 5). Alternatively, if the block instructions represent the line blocks 52 by coordinates in the form (y, x, d) where y is the y-coordinate of the line block 52, x is the x-coordinates of the start of the line block 52 and d is the length of the line block 52, then the coordinates of the line blocks 52 are (2, 4, 1), (3, 3, 5), (4, 2, 5), (5, 3, 4), (6, 3, 3), (7, 3, 3).

FIG. 3c shows in bold outline the shape of five rectangular blocks 53 identified by the block instructions that may be used to represent the region of interest 50. If the block instructions represent the rectangular blocks 53 by coordinates in the form (y1, x1, y2, x2) where x1 and y1 are the x-coordinate and y-coordinate of the upper left corner of the rectangular block 53 and x2 and y2 are the x-coordinate and y-coordinate of the lower right corner of the rectangular block 53, then the coordinates of the rectangular blocks 53 are (2, 4, 2, 4), (3, 3, 5, 6), (3, 7, 3, 7), (4, 2, 4, 2), (6, 3, 7, 5).

The addresses and/or micro-instructions are supplied from the block instruction buffer 25 to the pixel random address generator 22 and the ADC random address generator 32 on instruction lines 23 and 33, and on the basis thereof the pixel random address generator 22 generates pixel addresses and in synchronization the ADC random address generator 32 generates ADC random addresses. The ADC random address generator 22 may also use pixel addresses provided from the pixel random address generator 32 on a data line 24. This connects the desired pixel to the desired ADC lane 29, such that the digital signal representing the analogue pixel input is provided at the correct digital output.

The microprocessor 36 may also provide to the ADC random address generator 32 on a control line 34 ADC random address generator control signals that are setting and control signals for the ADC random address generator 32. These control signals may control the ADC random address generator 32 to select a specific ADC lane 29, as defined by the ADC lane address, or to select the next available ADC lane 29.

Figure 4:
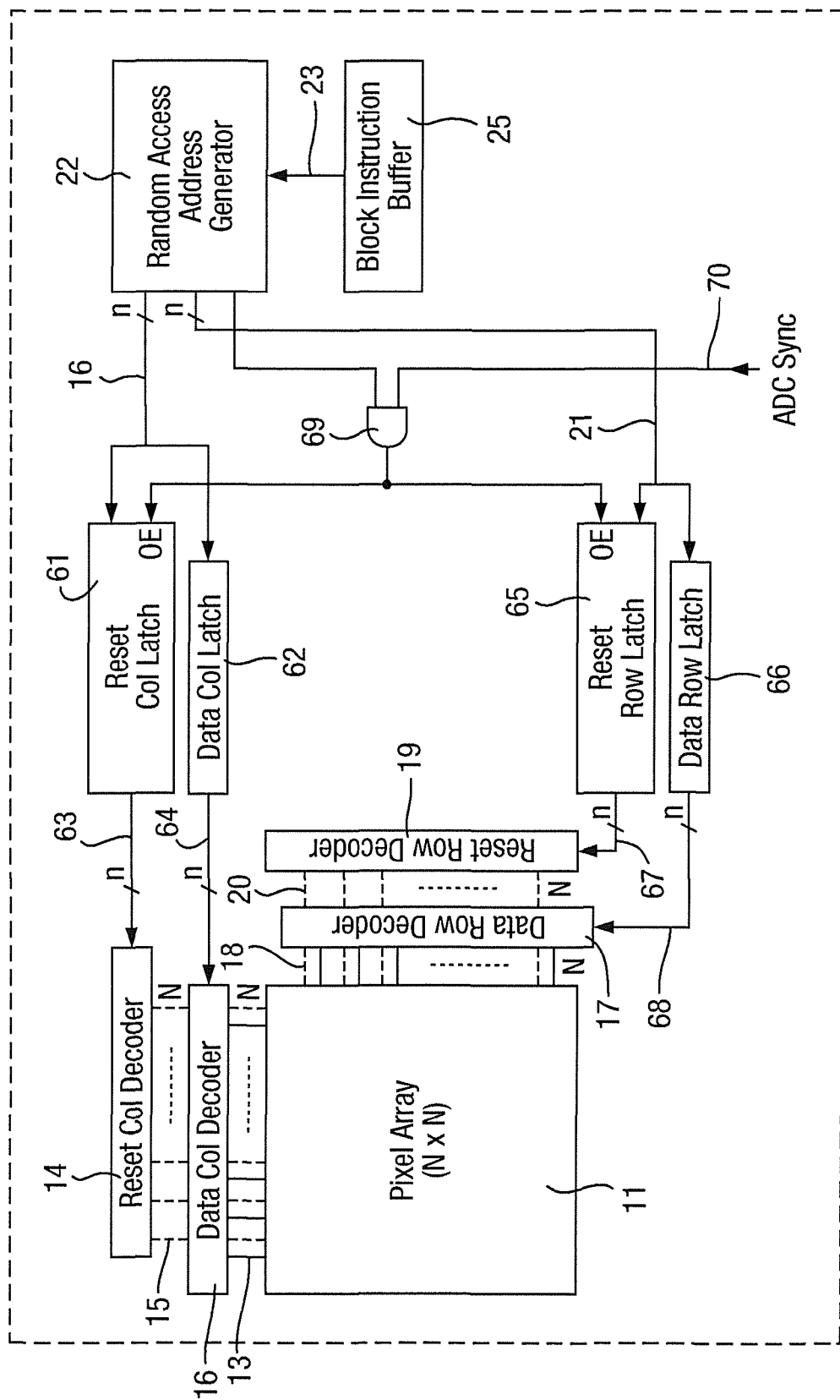
FIG. 4 is a detailed diagram of a pixel random access address generator.

FIG. 4 is a detailed diagram of the pixel random access address generator 22. In particular, the pixel random access address generator 22 additionally comprises a reset column address latch 61 and a data column address latch 62 that are supplied with the column address 16. The reset column address latch 61 and data column address latch 62 latch the column address 16 and respectively supply it to the reset column decoder 14 on line 63 and readout column decoder 12 on line 64. Similarly, the pixel random access address generator 22 additionally comprises a reset row address latch 65 and a data row address latch 66 that are supplied with the row address 21. The reset row address latch 65 and a data row address latch 66 latch the row address 21 and respectively supply it to the reset row decoder 19 on line 67 and readout column decoder 17 on line 68.

In addition, the reset column address latch 61 and the rest row address latch 65 each have an output enable control for reset synchronization. These output enable control are supplied with an output enable signal from an AND gate 69 whose inputs are connected to receive a pixel synchronization signal supplied by the pixel random access address generator 22 and an ADC synchronization signal supplied from the ADC random address generator 32 on a sync line 70. In operation, the AND gate 69 provides an output enable signal that enables the reset row and column address latches 61 and 65 whenever ADC line sampling is finished and the microinstruction allows it, thereby holding the data and reset decoders until the ADC lanes 29 are ready for further operation. This allows the operation of the pixel random access address generator 22 to operate in synchronization with the ADC random address generator 32.

An example of a block instruction and addressing control signals generated therefrom will now be described.

The block instruction may have the format: read enable, reset enable, start ADC number, number of ADC lanes, row coordinate, start column coordinate, stop column coordinate. An example of a block instruction in this format for the region of interest 50 shown in FIG. 3a is set out in the following table:

| Read | Reset | ADC | LANE | row | col1 | col2 |
|---|---|---|---|---|---|---|
| F | T | 0 | 4 | 2 | 4 | 4 |
| F | T | 0 | 4 | 3 | 3 | 7 |
| F | T | 0 | 4 | 4 | 2 | 6 |
| F | T | 0 | 4 | 5 | 3 | 6 |
| F | T | 0 | 4 | 6 | 3 | 5 |
| F | T | 0 | 4 | 7 | 3 | 5 |
| // Hold 1000 microseconds by accelerated imaging unit | | | | | | |
| T | T | 0 | 4 | 2 | 4 | 4 |
| T | T | 0 | 4 | 3 | 3 | 7 |
| T | T | 0 | 4 | 4 | 2 | 6 |
| T | T | 0 | 4 | 5 | 3 | 6 |
| T | T | 0 | 4 | 6 | 3 | 5 |
| T | T | 0 | 4 | 7 | 3 | 5 |

In this case, the pixel random address generator 12 and the ADC random address generator 22 generate read, reset and ADC signals and addresses as set out in the following table:

| Read | Reset | row | col | ADC | |
|---|---|---|---|---|---|
| F | T | 2 | 4 | 0 | // Reset pixel (4, 2) |
| F | T | 3 | 3 | 1 | // Reset pixel (3, 3) |
| F | T | 3 | 4 | 2 | // Reset pixel (4, 3) |
| F | T | 3 | 5 | 3 | // Reset pixel (5, 3) |
| F | T | 3 | 6 | 0 | // Reset pixel (6, 3) |
| F | T | 3 | 7 | 1 | // Reset pixel (7, 3) |
| F | T | 4 | 2 | 2 | // Reset pixel (2, 4) |
| F | T | 4 | 3 | 3 | // Reset pixel (3, 4) |
| F | T | 4 | 4 | 0 | // Reset pixel (4, 4) |
| F | T | 4 | 5 | 1 | // Reset pixel (5, 4) |
| F | T | 4 | 6 | 2 | // Reset pixel (6, 4) |
| F | T | 5 | 3 | 3 | // Reset pixel (3, 5) |
| F | T | 5 | 4 | 0 | // Reset pixel (4, 5) |
| F | T | 5 | 5 | 1 | // Reset pixel (5, 5) |
| F | T | 5 | 6 | 2 | // Reset pixel (6, 5) |
| F | T | 6 | 3 | 3 | // Reset pixel (3, 6) |
| F | T | 6 | 4 | 0 | // Reset pixel (4, 6) |
| F | T | 6 | 5 | 1 | // Reset pixel (5, 6) |
| F | T | 7 | 3 | 2 | // Reset pixel (3, 7) |
| F | T | 7 | 4 | 3 | // Reset pixel (4, 7) |
| F | T | 7 | 5 | 0 | // Reset pixel (5, 7) |
| | | | | | // Hold by accelerated imaging unit for/000 uS |
| T | T | 2 | 4 | 0 | // Read and reset pixel (4, 2), output to ADC-0 |
| T | T | 3 | 3 | 1 | // Read and reset pixel (3, 3), output to ADC-1 |
| T | T | 3 | 4 | 2 | // Read and reset pixel (4, 3), output to ADC-2 |
| T | T | 3 | 5 | 3 | // Read and reset pixel (5, 3), output to ADC-3 |
| T | T | 3 | 6 | 0 | // Read and reset pixel (6, 3), output to ADC-O |
| T | T | 3 | 7 | 1 | // Read and reset pixel (7, 3), output to ADC-1 |
| T | T | 4 | 2 | 2 | //Read and reset pixel (2, 4), output to ADC-2 |
| T | T | 4 | 3 | 3 | // Read and reset pixel (3, 4), output to ADC-3 |
| T | T | 4 | 4 | 0 | // Read and reset pixel (4, 4), output to ADC-O |
| T | T | 4 | 5 | 1 | // Read and reset pixel (5, 4), output to ADC-1 |
| T | T | 4 | 6 | 2 | // Read and reset pixel (6, 4), output to ADC-2 |
| T | T | 5 | 3 | 3 | // Read and reset pixel (3, 5), output to ADC-3 |
| T | T | 5 | 4 | 0 | // Read and reset pixel (4, 5), output to ADC-O |
| T | T | 5 | 5 | 1 | // Read and reset pixel (5, 5), output to ADC-1 |
| T | T | 5 | 6 | 2 | // Read and reset pixel (6, 5), output to ADC-2 |
| T | T | 6 | 3 | 3 | // Read and reset pixel (3, 6), output to ADC-3 |
| T | T | 6 | 4 | 0 | // Read and reset pixel (4, 6), output to ADC-O |
| T | T | 6 | 5 | 1 | //Read and reset pixel (5, 6), output to ADC-1 |
| T | T | 7 | 3 | 2 | // Read and reset pixel (3, 7), output to ADC-2 |
| T | T | 7 | 4 | 3 | // Read and reset pixel (4, 7), output to ADC-3 |
| T | T | 7 | 5 | 0 | // Read and reset pixel (5, 7), output to ADC-O |
| F | F | 0 | 0 | 0 | // Jump to the first instruction |

This produces the digital output result of sensing the region of interest 50 shown in FIG. 3a.

Figure 5:
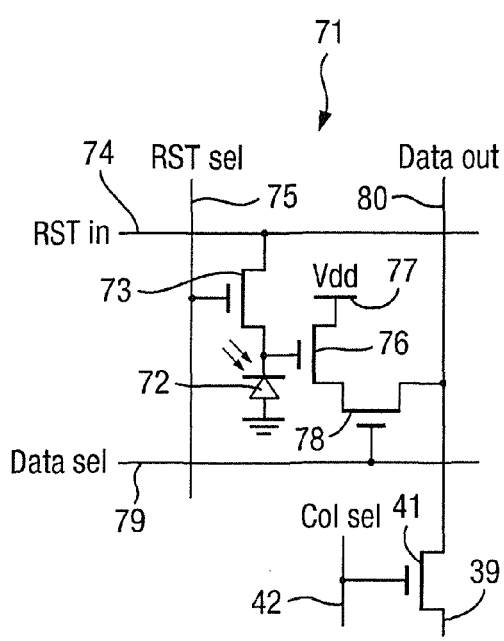
FIG. 5 is a diagram of a first example of an active pixel.

FIG. 5 is a diagram of a first example of an active pixel 71 in the pixel array. In this example, the pixel has a conventional 3T construction providing a random access reset although in general any construction may be applied. The pixel 71 is capable of being random access addressed by the active matrix addressing arrangement of control lines, as follows.

The active pixel 71 has a conventional CMOS construction including a diode 72 that is sensitive to the particle to be detected, which may be a photon or a charge particle. A reset device 73 is connected between the diode 72 and a reset row control line 74 that is connected to a row of pixels in common and receives a reset row control signal RST In. The reset device 73 acts as a switch controlled by a reset column control signal RST Sel on a reset column control line 75 connected to the input of the reset devices 73 in a column of pixels in common. Accordingly, the reset device 73 selectively resets the diode 72 when the pixel 71 is addressed by the combination of the reset row control signal RS In and the reset column control signal RST Sel.

The diode 72 is also connected to the input of a buffer device 76 biased by a bias voltage Vdd on a bias line 77 connected to all the pixels 71. The buffer device 76 buffers and amplifies the voltage across the diode 72.

The output of the buffer device 76 is connected to a data line 80 by a pixel sampling device 78. The pixel sampling device 78 acts as a switch controlled by a readout row control signal Data Sel on a readout row control line 79 connected to the input of the pixel sampling devices 78 in a row of pixels 71 in common, to produce an output signal representative of the charge collected by the diode 72 as a readout signal Data Out on the data line 80.

The data line 80 of a pixel 71 is connected to the output line 39 by a column sampling device 41 that may be in common to an entire column of pixels 71. The column sampling device 41 acts as a switch controlled by a readout column control signal Col sel on a readout column control line 42 connected to the input of the column sampling device 41, to supply to the output line 39 the pixel readout signal Data Out from the pixel 71 addressed by combination of the readout column signal Col sel and row control signal Data Sel.

Figure 6:
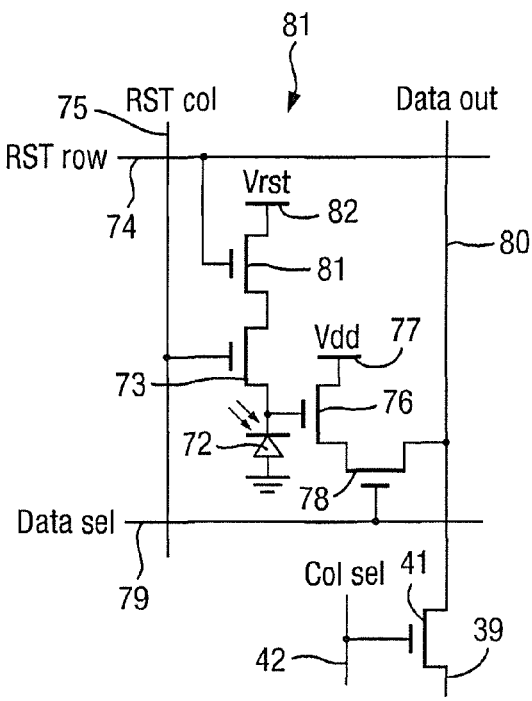
FIG. 6 is a diagram of a second example of an active pixel.
Figure 7:
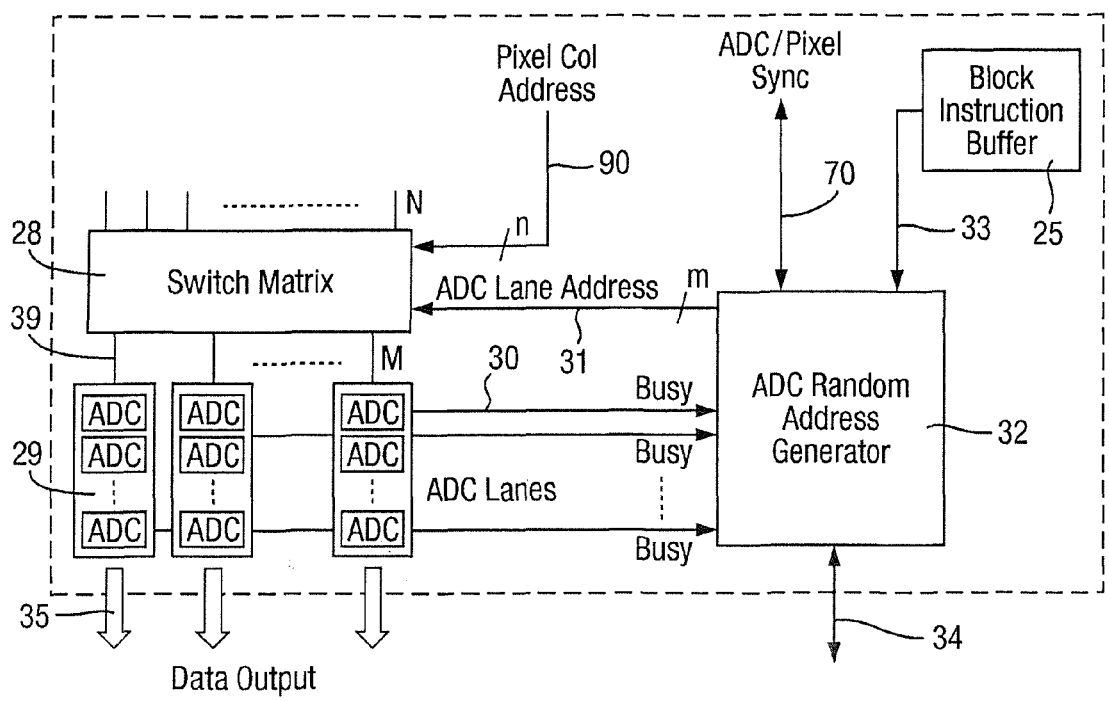
FIG. 7 is a detailed diagram of an ADC random address generator.

FIG. 6 is a diagram of a second example of an active pixel 81 in the pixel array. In this example, the pixel 81 has a 4T construction providing a random access read and reset, having the same construction as the pixel 71 in the first example (and so for common elements the same reference numerals are used and the description is not repeated) except that a reset control device 81 is connected between the reset device 73 and the reset row control line 74 to act as a switch controlled by the reset row control signal RST Row. The reset control device 81 is also connected to a rest bias voltage VRST on a bias line 82 connected to all the pixels 81. Accordingly, the diode 72 is selectively reset when the pixel is addressed by the combination of the reset row control signal RST Row on the reset row control line 74 and the reset column control signal RST Col on the reset column control line 75. FIG. 7 is a detailed diagram of the ADC random address generator 32 providing a more detailed schematic of the ADC lane array addressing, showing the required connections with the ADC random address generator 32, switching matrix 28, and showing the further control lines required to the pixel random access generator, block instruction buffer 25 and microprocessor 36.

FIG. 7 illustrates an alternative in which the switch matrix 28 is controlled by an input from the ADC random address generator 32 on switch control line 31 that indicates the ADC line 29 and an input from the pixel random address generator 22 on control line 90 that indicates the pixel column being addressed. The control line 5 carries a control signal in a binary format that identifies the ADC lane 29. In general, if there are M ADC lanes 29, then the binary address has m bits where M=2 m. On the basis of these inputs, the switch matrix 28 selectively connects the output lines 39 on which the addressed pixels provide pixel readout signals, in synchronization with the addressing of the pixels, to selected ADC lanes 29.

In addition, FIG. 7 shows the ADC random address generator 32 supplying the ADC synchronization signal on sync line 70 to the pixel random address generator 22.

Figure 8:
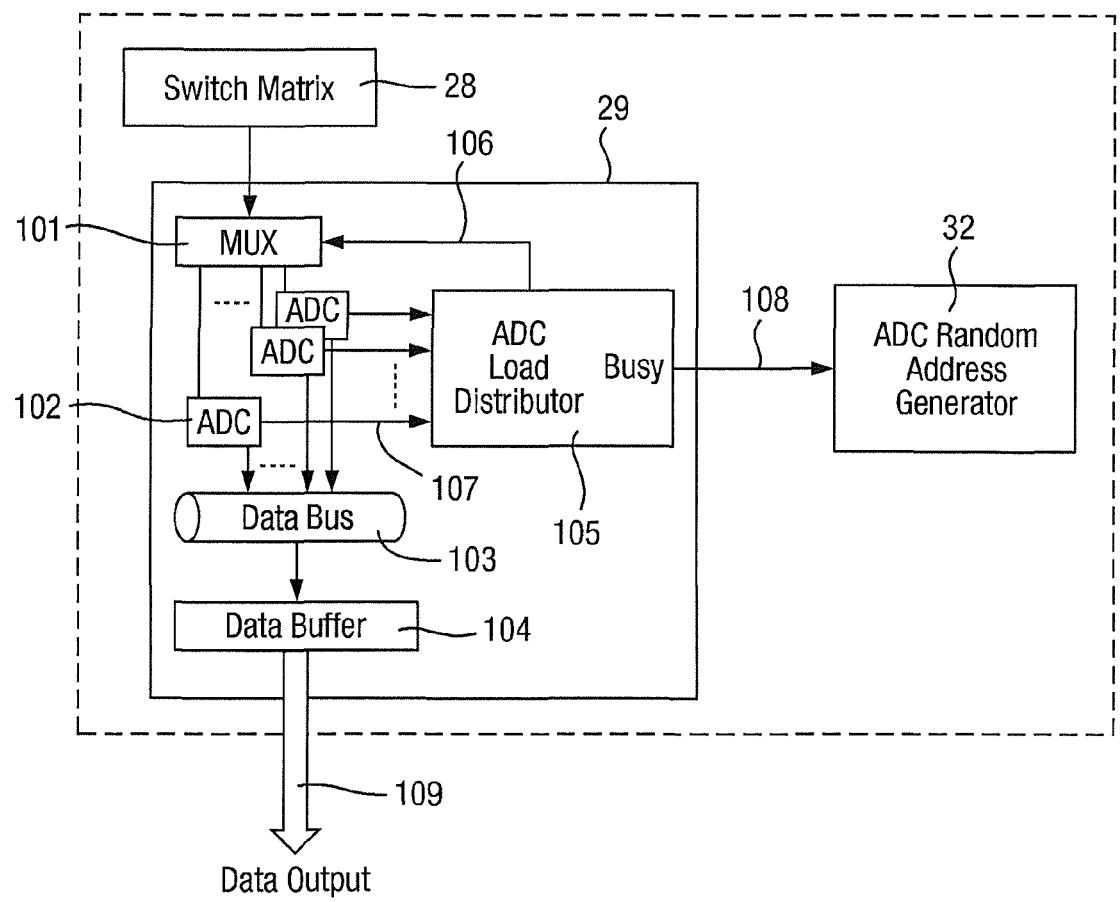
FIG. 8 is a diagram of an ADC lane.

FIG. 8 is a diagram of a single ADC lane 29, all of which have an identical construction. The ADC lane 29 comprises a plurality of ADCs 102 which may have a conventional construction. The number of ADCs 102 is dependent on the ratio of the ADC conversion speed to the pixel readout speed. By so combining ADCs 102 into a single ADC lane 29, the ADC lane 29 can provide higher throughput bandwidth compared to a simple ADC.

A multiplexer 101 is connected between the switch matrix 28 and the ADCs 102 and multiplexes the pixel readout signals supplied to the ADC lane 29 to the ADCs 102 in succession, i.e. one at a time. Thus the multiplexer 101 is a 1-to-P multiplexer, where P is the number of ADCs 102.

The ADC lane 29 further comprises a load distributor 105 that monitors the operation of the ADCs 102 on the basis of a status signal supplied from the ADCs 102 on a module status line. The status signal indicates whether the ADC 102 is ready for operation. The load distributor 105 controls the multiplexer 101 by supplying a signal on a control line 106, the control being based on the monitored operation according to pre-set logic, in particular selecting an ADC 102 that is ready for operation. The load distributor 105 also generates the status signals that are described above and supplies them on a status line 108 to the ADC random address generator 32.

The digital signals output from the ADCs 102 are supplied to a local data bus 103 that provides a local data connection among the ADCs 102 to an output buffer 104.

As an alternative to this construction, each ADC lane 29 could comprise a single ADC 102.

Figure 9:
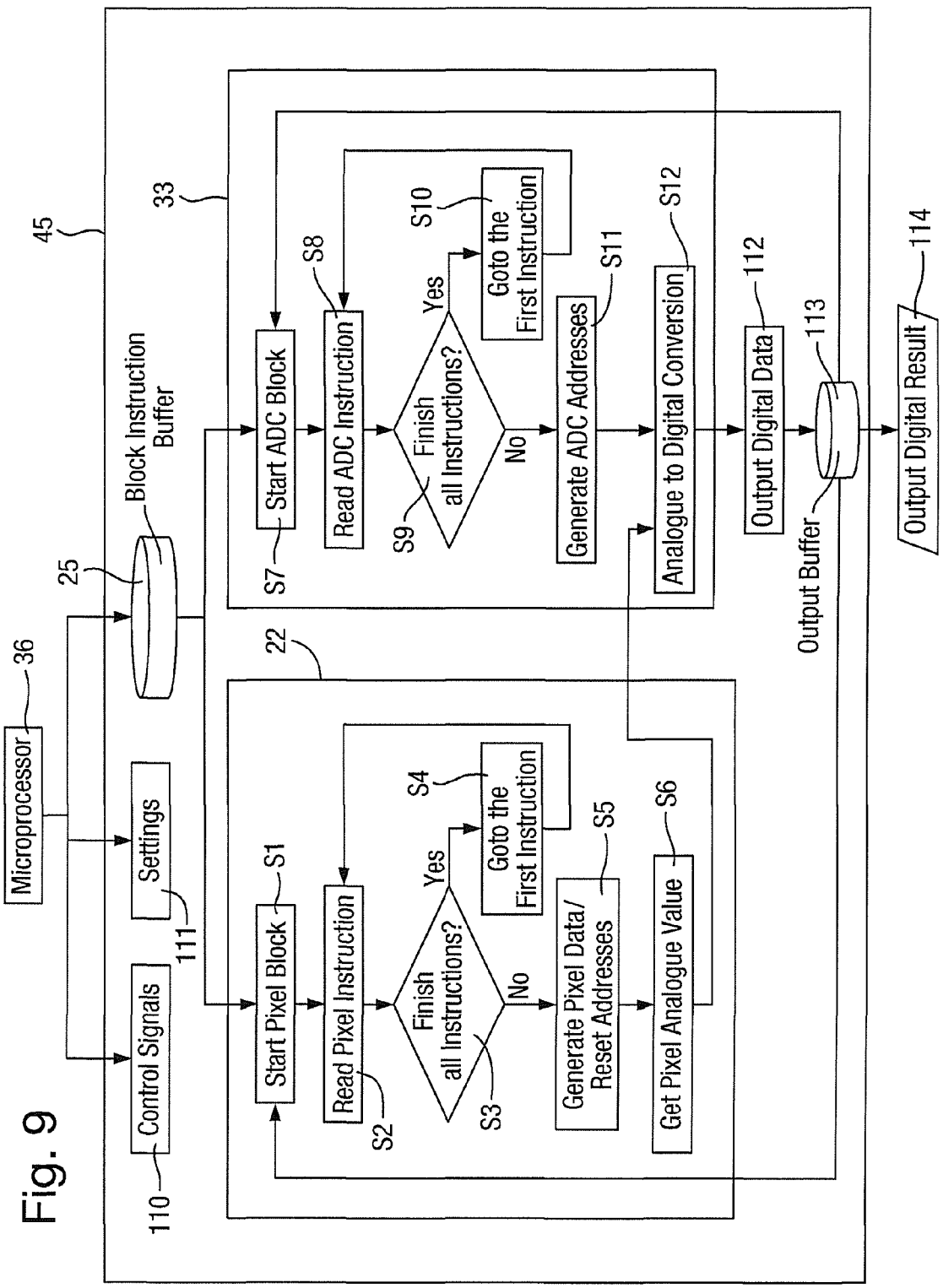
FIG. 9 is a flowchart of the data and command flow within the active pixel image sensor.

FIG. 9 is a flowchart of the data and command flow during the operation of the active pixel image sensor 45 described above. The data and command flow is as follows.

As described above, the microprocessor 36 supplies the active pixel image sensor 45 with control signals 110, settings 111 and block instructions that are loaded into the block instruction buffer 25. The pixel random access address generator 22 and the ADC random address generator 32 use the block instructions as follows to generate output digital data 112 in respect of each block that is stored in an output buffer 113 prior to being output from the active pixel image sensor 45 as the output digital signal 114.

The pixel random access address generator 22 uses the block instructions as follows.

In step S1, the next pixel block is selected based on the data stored in the output buffer 113.

In step S2, the next pixel instruction for the block is read. In step S3, it is checked whether all the pixel instructions are finished and if so in step S4 the first pixel instruction is set before reverting to step S2.

In step S5, the pixel data and reset addresses are generated, with the result that in step S5 the pixel analog values are output from the pixel array 11.

The ADC random address generator 32 use the block instructions as follows.

In step S7, the next ADC block is selected based on the data stored in the output buffer 113.

In step S8, the next ADC instruction is read. In step S9, it is checked whether all the ADC instructions are finished and if so in step S10 the first ADC instruction is set before reverting to step S8.

In step S11, the ADC addresses are generated.

In step S12, analog-to-digital conversion of the pixel analog values generated in step S6 is performed, resulting in generation of the output digital data 112.

The active pixel image sensor 45 described above may be used for advanced imaging applications that require programmable optimization, such as for highest frame rate, dynamic range or data compression. One area of use is in scientific applications that require independent programmable regions of interest of different frame rate on the same imaging chip, but there are a wide range of other applications, for example for machine vision, such as face recognition, object tracing, smart cameras, such as for security, or general consumer electronics.

The invention claimed is:

1. An active pixel image sensor comprising:
a pixel array of active pixels that are capable of being random access addressed to provide pixel readout signals from the addressed pixels on N output lines, where N is a plural integer;
M ADC lanes arranged in parallel and each capable of performing analog-to-digital conversion of pixel readout signals, where M is a plural integer less than N;
a switching arrangement capable of selectively connecting output lines to the M ADC lanes;
a control unit arranged to provide random access addressing of the pixels, and in synchronisation therewith to control the switching arrangement in accordance with the random access addressing of the pixels to connect the output lines on which the addressed pixels provide pixel readout signals to selected ADC lanes,
wherein each ADC lane is arranged to supply a status signal to the control unit that indicates whether it is ready for operation, and the control unit is arranged to control the switching arrangement in response thereto so as to connect the output lines on which the addressed pixels provide pixel readout signals to ADC lanes that are indicated by their status signals to be ready for operation.

2. An active pixel image sensor according to claim 1, wherein the control unit is capable of providing random access addressing of different pixels of the image sensor at different rates.

3. An active pixel image sensor according to claim 1, wherein the control unit comprises:
a pixel addressing unit arranged to provide random access addressing of the pixels; and
an ADC addressing unit arranged to perform said control of the switching arrangement, the pixel addressing unit and the ADC addressing unit being arranged to operate in synchronisation.

4. An active pixel image sensor according to claim 3, wherein the pixel addressing unit comprises:
a pixel address generator arranged to provide random access pixel addresses of pixels; and
a decoder arrangement that receives the pixel addresses generated by the pixel address generator and is arranged to provide, in accordance with the received pixel addresses, control signals on control lines of the pixel array for addressing pixels.

5. An active pixel image sensor according to claim 1, wherein each of the ADC lanes comprises:
a plurality of analogue-to-digital converters;
a multiplexer arranged to multiplex the pixel readout signals supplied to the ADC lane in succession to the analogue-to digital converters of the ADC lane.

6. An active pixel image sensor according to claim 5, wherein each of the ADC lanes further comprises a load distributor arranged to monitor the operation of the analogue-to digital converters of the ADC lane and to control the multiplexer based on the monitored operation.

7. An active pixel image sensor according to claim 1, wherein the switching arrangement is capable of selectively connecting any of the N output lines to any of the M ADC lanes.

8. An active pixel image sensor according to claim 1, wherein the control unit is arranged to control the switching arrangement in accordance with the random access addressing of the pixels to connect the output lines on which the addressed pixels provide pixel readout signals to selected ADC lanes in succession.

9. An active pixel image sensor according to claim 1, wherein the pixel array comprises control lines capable of providing addressing of pixels of the pixel array in a random access manner.

10. An active pixel image sensor according to claim 9, wherein the control lines comprise reset control lines capable of resetting the pixels and readout control lines capable of controlling the pixels to provide the pixel readout signals.

11. An active pixel image sensor according to claim 9, wherein the control lines have a matrix addressing arrangement.

12. An active pixel image sensor according to claim 1, wherein the pixels have a CMOS construction.

13. An active pixel image sensor according to claim 1, implemented in a semiconductor chip.

* * * * *